(12) United States Patent
Li et al.

(10) Patent No.: US 11,824,159 B2
(45) Date of Patent: Nov. 21, 2023

(54) ANODE-FREE SOLID-STATE BATTERY AND METHOD OF BATTERY FABRICATION

(71) Applicant: GM GLOBAL TECHNOLOGY OPERATIONS LLC, Detroit, MI (US)

(72) Inventors: Zhe Li, Shanghai (CN); Yong Lu, Shanghai (CN); Haijing Liu, Shanghai (CN); Qili Su, Shanghai (CN); Xiaochao Que, Shanghai (CN); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 17/458,903

(22) Filed: Aug. 27, 2021

(65) Prior Publication Data
US 2023/0063684 A1  Mar. 2, 2023

(51) Int. Cl.
| | |
|---|---|
| H01M 10/0565 | (2010.01) |
| H01M 10/0525 | (2010.01) |
| H01M 4/525 | (2010.01) |
| H01M 4/505 | (2010.01) |
| H01M 4/02 | (2006.01) |

(52) U.S. Cl.
CPC ....... *H01M 10/0565* (2013.01); *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2020/0365903 A1* | 11/2020 | Ogata | ................... | H01M 4/661 |
| 2021/0036327 A1* | 2/2021 | Ogata | ................... | H01M 4/382 |

OTHER PUBLICATIONS

Tian et al., Nano Energy, 78 (2020) 105344, pp. 1-23. (Year: 2020).*

* cited by examiner

*Primary Examiner* — Eli S Mekhlin
(74) *Attorney, Agent, or Firm* — Quinn IP Law

(57) ABSTRACT

An anode-free solid-state battery includes a cathode layer having transient anode elements and a bare current collector devoid of non-transitory anode material and configured to accept thereon the transient anode elements. The battery also includes a solid-state electrolyte layer defining voids and arranged between the current collector and the cathode layer. The battery additionally includes a gel situated within the solid-state electrolyte and cathode layers, to permeate the electrolyte voids and form a gelled solid-state electrolyte layer, coat the cathode layer, and facilitate ionic conduction of the anode elements between the cathode layer, the solid-state electrolyte layer, and the current collector. Charging the battery diffuses the anode elements from the cathode layer, via the gelled solid-state electrolyte layer, onto the current collector. Discharging the battery returns the anode elements, via the gelled solid-state electrolyte layer, to the cathode layer. A particular method is used to fabricate the anode-free solid-state battery.

20 Claims, 5 Drawing Sheets

ANODE-FREE SOLID-STATE BATTERY AND METHOD OF BATTERY FABRICATION

INTRODUCTION

The present disclosure relates to an anode-free solid-state battery and a method of fabricating the same.

Electrochemical energy storage devices, such as lithium-ion batteries, may be used to power such diverse items as toys, consumer electronics, and motor vehicles. Typically, a battery includes two electrodes, as well as an electrolyte component and/or a separator. One of the two electrodes generally serves as a positive electrode or cathode, and the other electrode serves as a negative electrode or anode. Such batteries may also include various terminal and packaging materials. Electrochemical battery cells may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be in a solid form, a liquid form, or a solid-liquid hybrid. A separator and/or electrolyte may be disposed between the negative and positive electrodes. The electrolyte is employed for conducting lithium ions between the electrodes and, like the electrodes, may be in a solid form, a liquid form, or a solid-liquid hybrid. In the instances of solid-state batteries, which include solid-state electrolyte layers disposed between solid-state electrodes, the solid-state electrolyte layer physically separates the solid-state electrodes so that a distinct separator is not required. In particular, rechargeable lithium-ion batteries operate by reversibly passing lithium ions back and forth between the negative electrode and the positive electrode. For example, lithium ions may move from the positive electrode to the negative electrode during charging of the battery and in the opposite direction when the battery is discharging.

Compared to batteries using liquid electrolytes, solid-state batteries typically have advantages such as longer shelf life, lower self-discharge rate, simpler packaging and thermal management, and the ability to operate within a wider temperature window. For example, solid-state electrolytes are generally non-volatile and non-flammable, which permits such cells to be cycled under harsher conditions without experiencing diminished potential or thermal runaway. However, compared to batteries using liquid electrolytes, solid-state batteries generally have lower power capabilities and limited energy densities.

SUMMARY

An anode-free solid-state battery includes a cathode layer having a host cathode material including transient anode elements. The anode-free solid-state battery also includes a bare current collector characterized by an absence of non-transitory anode material and configured to accept thereon the transient anode elements during battery charging. The battery additionally includes a solid-state electrolyte layer defining voids and arranged between the bare current collector and the cathode layer. The battery also includes a gel situated within each of the solid-state electrolyte layer and the cathode layer. Thus situated, the gel is configured to permeate the voids in the solid-state electrolyte layer to form a gelled solid-state electrolyte layer, coat the host cathode material, and facilitate ionic conduction of the anode elements between the cathode layer, the solid-state electrolyte layer, and the bare current collector. Charging of the subject battery extracts the anode elements from the cathode layer, diffuses the anode elements via the gelled solid-state electrolyte layer, and deposits the anode elements onto the bare current collector to form a transient anode material. Discharging of the subject battery returns the anode elements, via the gelled solid-state electrolyte layer, from the current collector to the cathode layer.

The subject anode-free solid-state battery may be a lithium-ion battery, and may include multiple bipolarly stacked battery cells, such that each interior cathode layer is positioned adjacent an interior current collector.

The bare current collector may be an outer current collector arranged on an outer battery cell and is configured as a single layer copper foil.

The bare current collector may be part of an intermediate current collector arranged between individual battery cells and configured as a clad foil having a copper layer and an aluminum layer, such that the aluminum layer is positioned between the copper layer and the cathode layer.

The battery may also include a polymer blocker element configured to encapsulate and seal the gel and the solid-state electrolyte within the battery.

The polymer blocker element may have a 2-200 micron thickness. Material of the polymer blocker element may include at least one of a hot-melt adhesive, polyethylene or polypropylene resin, a silicone, e.g., polyamide or epoxy resin, and an acrylic resin or rubber, isocyanate adhesive, acrylic or cyanoacrylate adhesive.

In a lithium-ion battery, the host cathode material may include at least one of olivine, polyanion cathode, lithium transition-metal oxide, e.g., a rock salt layered oxide, spinel, a cathode material surface-coated and/or doped with a lithium transition-metal oxide, and a low-voltage cathode material, e.g., lithiated metal oxide/sulfide or lithium sulfide.

The material of the cathode layer may additionally include a conductive additive having at least one of carbon black, graphite, graphene, graphene oxide, acetylene black, and carbon nanofibers/nanotubes.

The host cathode material and/or the solid-state electrolyte layer may additionally include a binder material having at least one of polyvinylidene fluoride (PVDF), polytetrafluoroethylene (PTFE), sodium carboxymethyl cellulose (CMC), styrene rubber (SBR), nitrile butadiene rubber (NBR), and styrene ethylene butylene styrene copolymer (SEBS).

The gel may include a polymer constituent material and a liquid electrolyte. A method of fabricating an anode-free solid-state battery, such as a lithium-ion battery, is also disclosed. The method specifically includes arranging adjacent one another the solid-state electrolyte layer and the cathode layer, wherein the solid-state electrolyte layer defines voids and is combined with a gel precursor including a solvent. The method also includes forming the gel within the solid-state electrolyte layer and the cathode layer, to thereby form the gelled solid-state electrolyte layer and coat the host cathode material. The method additionally includes arranging against the gelled solid-state electrolyte layer the bare current collector characterized by the absence of non-transitory anode material and configured to accept thereon the transient anode elements during battery charging.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
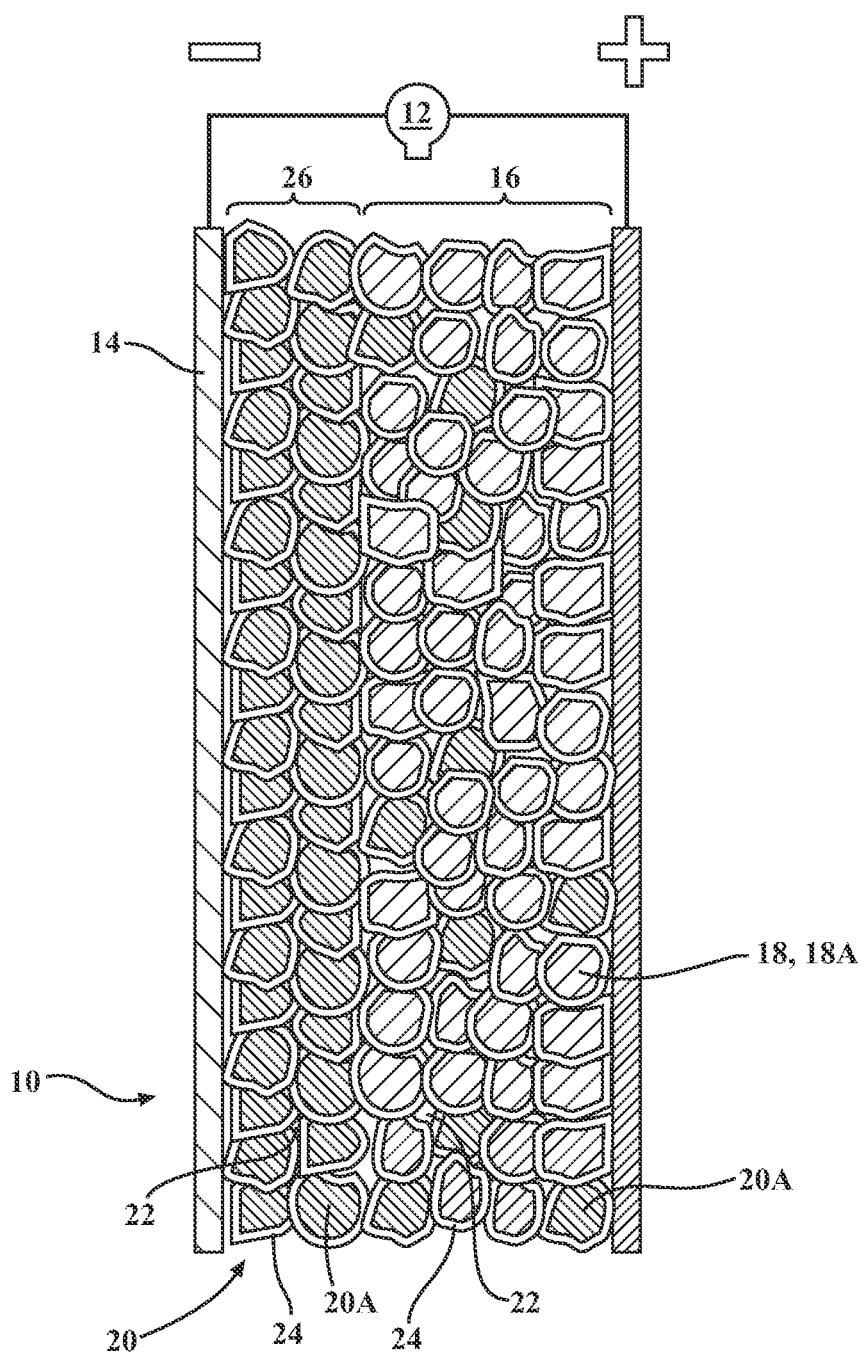
FIG. 1 is a schematic view of electrical energy storage cell powering a load, the energy storage cell being shown as a lithium-ion (Li-Ion) battery having a bare current collector, a cathode layer, and a gelled solid-state electrolyte layer, according to the disclosure.

Referring to FIG. 1, an electrical energy storage battery 10 powering a load 12 is depicted. The electrical energy storage battery 10 is shown as an anode-free, solid-state battery. The description "anode free" is herein intended to denote an electrochemical battery characterized by the absence of a permanent anode material, having, as manufactured, an anode material deposited thereon. The subject anode free battery is constructed such that electrical current cannot be accepted or be supplied by the battery prior to initial charging and corresponding formation of the anode. The description "solid-state" is herein intended to denote an electrochemical battery employing an electrolyte in non-liquid form. The anode-free, solid-state battery 10 may specifically be a lithium-ion (Li-Ion) battery.

Generally, Li-Ion batteries are rechargeable electrochemical batteries notable for their high specific energy and low self-discharge. The Li-Ion batteries may be used to power such diverse items as toys, consumer electronics, and motor vehicles. The subject vehicle may include, but not be limited to, a commercial vehicle, industrial vehicle, passenger vehicle, aircraft, watercraft, train or the like. It is also contemplated that the vehicle may be a mobile platform, such as an airplane, all-terrain vehicle (ATV), boat, personal movement apparatus, robot and the like to accomplish the purposes of the present disclosure. Typically, in Li-Ion batteries lithium ions move from the anode (a negative electrode) through an electrolyte to the cathode (a positive electrode) during discharge, and back when charging.

Generally, the reactants in the electrochemical reactions in a battery cell are materials of the anode and the cathode. Li-Ion batteries commonly use a lithium compound as the material at the positive electrode and graphite at the negative electrode. During discharge, an oxidation half-reaction at the anode produces positively charged lithium ions and negatively charged electrons. The oxidation half-reaction may also produce uncharged material that remains at the anode. Lithium ions move through the electrolyte, electrons move through an external circuit (including a connection to the electrical load or to a charging device), and then they recombine at the cathode (together with the cathode material) in a reduction half-reaction. The electrolyte and the external circuit provide conductive media for lithium ions and electrons, respectively, but do not partake in the electrochemical reaction.

During discharge of an electrochemical battery, such as the battery 10, electrons flow from the anode toward the cathode through the external circuit. The reactions during discharge lower the chemical potential of the cell, so discharging transfers energy from the cell to wherever the electric current dissipates its energy, mostly in the external circuit. During charging, the described reactions and transports go in the opposite direction: electrons move from the positive electrode to the negative electrode through the external circuit. To charge the cell, the external circuit has to provide electric energy. This energy is then stored (with some loss) as chemical energy in the cell. In a typical Li-Ion cell, both the anode and cathode allow lithium ions to move in and out of their structures via a process called insertion (intercalation) and extraction (deintercalation), respectively.

The battery 10 shown in FIG. 1 assembled with a "bare" current collector 14 specifically defined herein as excluding, i.e., is characterized by the absence of, non-transitory or permanent anode material, such as graphite in a Li-Ion battery cell. The bare current collector 14 may, for example, be manufactured from copper, graphene, or carbon coated copper foil for the subject material's resistance to corrosion. Alternatively, the bare current collector 14 may be manufactured from nickel, stainless steel, or other conductive materials inert to reduction, and, specifically in a Li-Ion battery, nonreactive to lithium. The battery 10 also includes a cathode layer 16 having a host cathode material 18 (e.g., $LiFePO_4$), which includes transient anode elements 18A therein, such as lithium ions. The bare current collector 14 is configured to accept thereon, during battery charging, the transient anode elements (e.g., lithium ions in a Li-Ion battery) housed on the cathode layer 16 to thereby form a transitory anode.

The battery 10 also includes a high-temperature, i.e., thermal energy stable, solid-state electrolyte layer 20. The solid-state electrolyte layer 20 includes solid-state electrolyte particles 20A, which may for example, be oxide based. As shown in FIG. 1, the cathode layer 16 may also include solid-state electrolyte particles 20A. Additionally, the solid-state electrolyte layer 20 defines voids 22. The cathode layer 16 is in direct contact with the solid-state electrolyte layer 20. To enhance structural integrity of the solid-state electrolyte layer, the solid-state electrolyte layer 20 may include a binder material employing at least one of polyvinylidene fluoride (PVDF), polytetrafluoroethylene (PTFE), sodium carboxymethyl cellulose (CMC), styrene rubber (SBR), nitrile butadiene rubber (NBR), and styrene ethylene butylene styrene copolymer (SEBS) solid-state electrolyte.

Figure 2A:
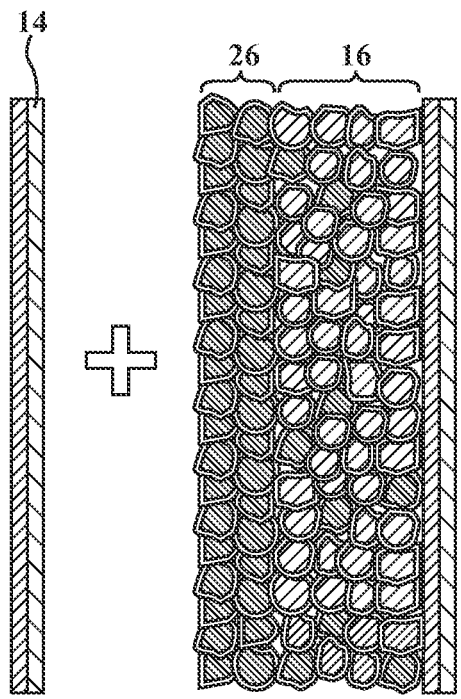
FIG. 2A is a schematic view of electrical energy storage cell shown in FIG. 1, depicting a solid electrolyte layer coated directly onto the cathode layer.
Figure 2B:
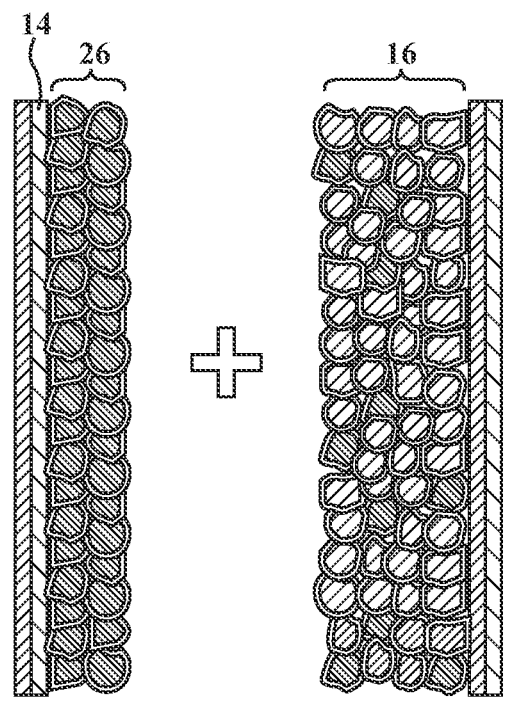
FIG. 2B is a schematic view of electrical energy storage cell shown in FIG. 1, depicting a solid electrolyte layer coated directly onto the bare current collector.

The battery 10 additionally includes a gel 24 situated within each of the solid-state electrolyte layer 20 and the cathode layer 16. Specifically, in the fully assembled battery 10, the gel 24 may be located between and interspersed among the solid-state electrolyte particles 20A and the host cathode material 18 in the cathode layer 16, and similarly in the solid-state electrolyte layer 20, to facilitate ionic conduction between the cathode layer 16 and the solid-state electrolyte layer 20. The gel 24 may additionally be applied directly onto the cathode layer 16 (shown in FIG. 2A) to coat the host cathode material 18 and/or onto the bare current collector 14 (shown in FIG. 2B) to enhance ionic conduction of the anode elements 18A. The gel 24 may be formed from a gel precursor solution having a polymer host or constituent material, a liquid electrolyte, and a solvent configured to dissolve the polymer host. The polymer host material, the liquid electrolyte, and the solvent may make up 0.1-50%, 5-90%, and 10-80% by weight, respectively, of the gel precursor solution. Evaporation of the solvent is intended to form the gel 24 in-situ within the battery 10. The solvent may be effectively evaporated from the gel precursor by drying the prefabbed battery structure at room temperature (25 degrees C.) or above for 30 minutes to 24 hours. The gel precursor may be loaded into the structure of the battery 10 such as by drop, spray, or dip coating therewith the cathode layer 16 and/or the bare current collector 14.

The gel 24 is selected to withstand operating temperatures of the battery 10 and configured to permeate the voids 22 in the solid-state electrolyte layer 20 and thereby form a gelled solid-state electrolyte layer 26. The in-situ formed gel 24 is intended to wet the interface between oxide electrolytes to build up favorable ionic contacts to boost ionic conduction within the gelled solid-state electrolyte layer 26 while mitigating possibility of shunt currents in the battery cell. The ratio of the gel 24 in the battery 10 may be up to 50% by weight. Various types of gels 24 may be used. Distinct gels 24 may be used to coat the cathode layer 16 and the bare current collector 14 in the same battery 10.

Figure 4:
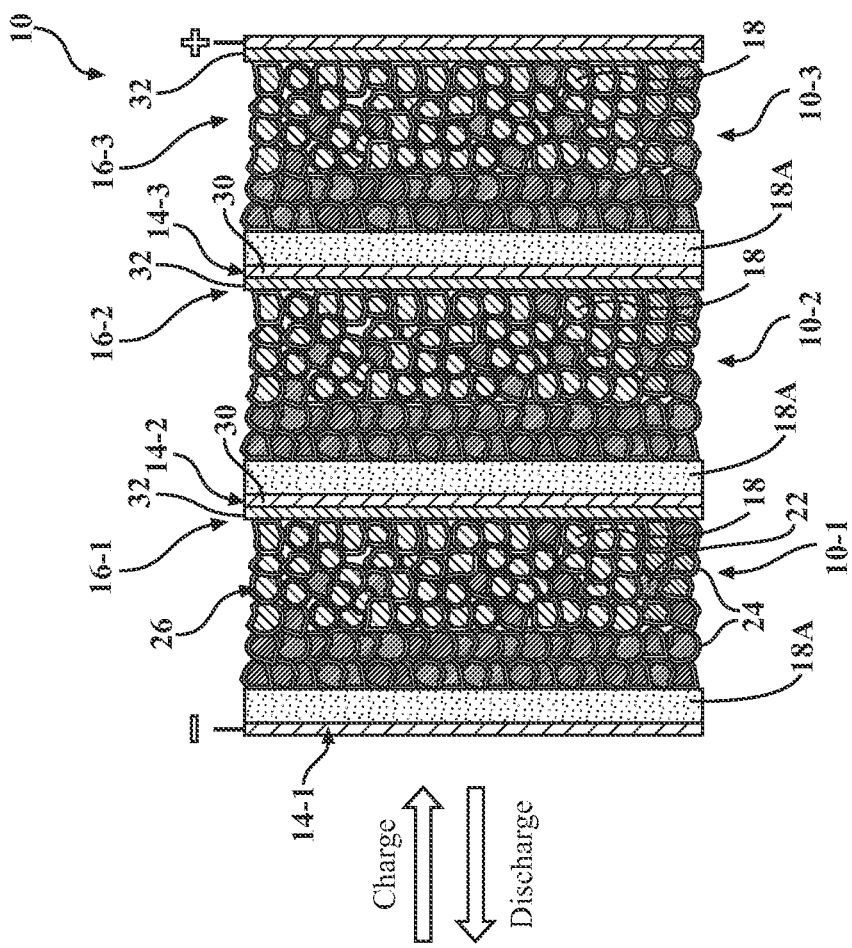
FIG. 4 is a schematic perspective view of the battery module shown in FIG. 3, specifically depicting charging and discharging of the battery cells, according to the disclosure.
Figure 4:
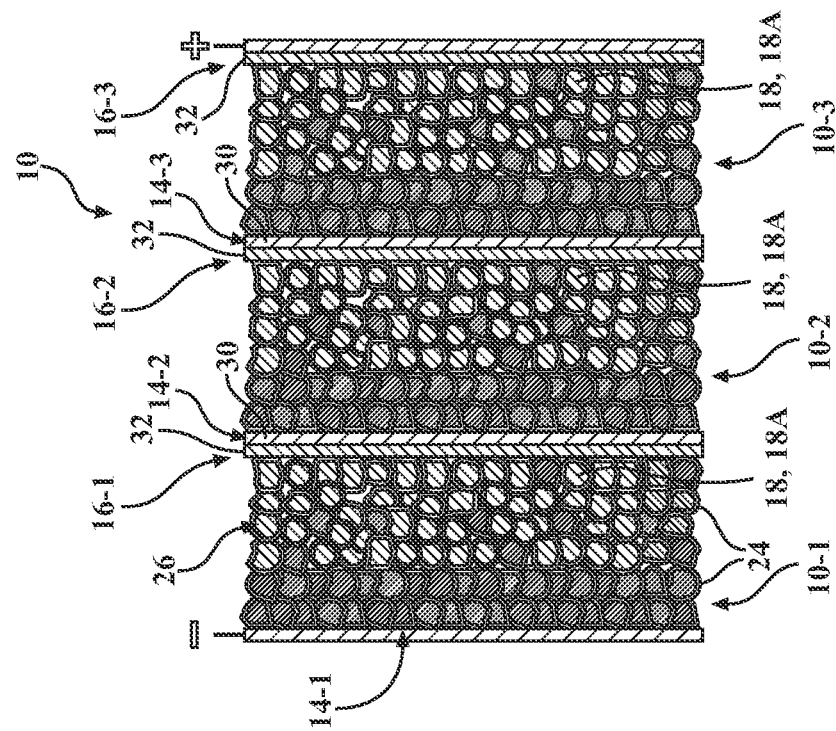

As shown in FIG. 4, charging of the battery 10 dislodges and extracts the anode elements 18A, such as lithium, from the cathode layer 16. Furthermore, charging of the battery 10 diffuses the subject anode elements 18A via the gelled solid-state electrolyte layer 26 to deposit and build up, via plating, the anode elements onto the bare current collector 14. Such plating of the anode elements 18A onto the bare current collector 14 thereby forms a temporal and transient, i.e., reversible, in-situ battery anode. Accordingly, charging of the battery 10 generates the anode after the battery has been put into service. Discharging of the battery 10 strips the in-situ formed anode elements 18A from the current collector 14 and returns the anode elements, via the gelled solid-state electrolyte layer 26, to the cathode layer 16 (shown in FIG. 4).

In general, effectiveness of the battery anode active material in intercalating energy particles is directly related to the battery's performance. For example, in a typical Li-Ion battery, the ability of the active material to hold lithium is directly related to the energy density and cycling capacity of the battery. The in-situ formation of the anode material on the current collector 14 is specifically intended to provide a higher performance, i.e., increased energy density, battery 10. The use of the solid-state electrolyte layer 20 is further intended to enhance the battery's tolerance to abusive conditions, such as overheating, penetration by a foreign object, and internal and external short circuits. Additionally, assembling the battery 10 without a pre-formed anode may reduce the battery's complexity and cost.

Figure 3:
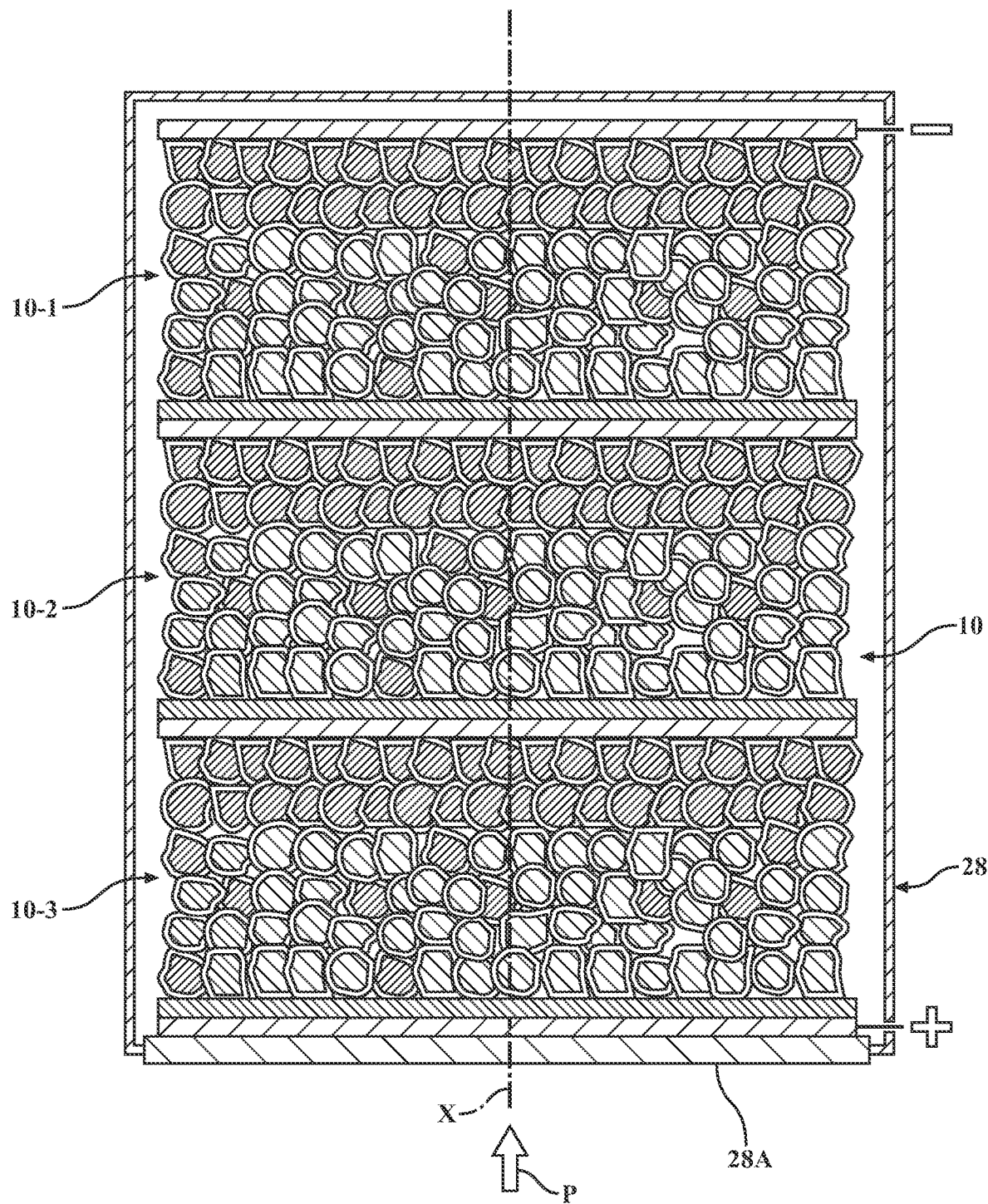
FIG. 3 is a schematic perspective view of a battery module embodiment of the battery shown in FIG. 1 having multiple cells having a structure according to the disclosure.
Figure 5:
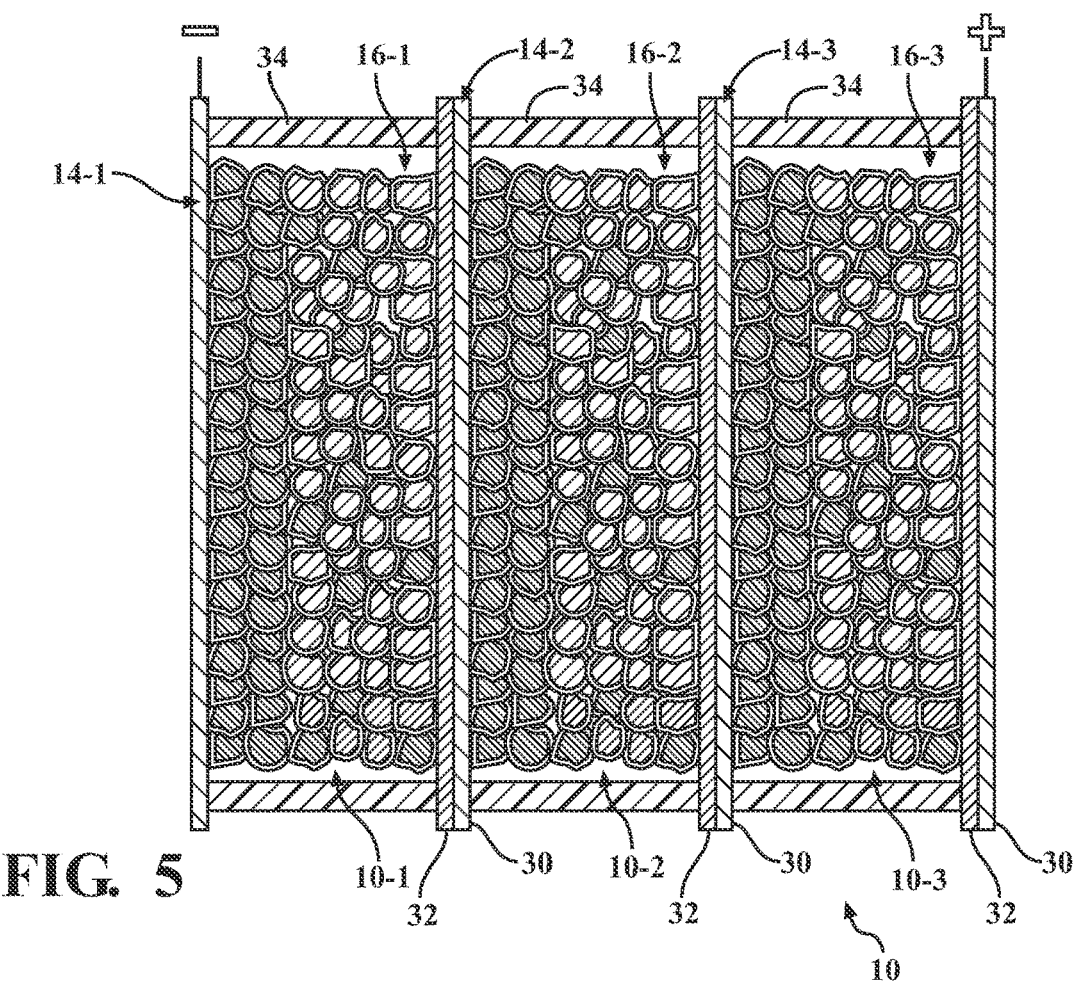
FIG. 5 is a schematic illustration of the battery module shown in FIG. 3 including polymer blocker elements configured to encapsulate and seal the gel and the solid-state electrolyte layer within the individual battery cells, according to the disclosure.

As shown in FIGS. 3-5, the battery 10 may be configured as a battery module having multiple bipolarly stacked battery cells 10-1, 10-2, and 10-3, i.e., negative to positive electrode, thereby permitting the cells to be connected in series. Although specifically three cells, 10-1, 10-2, 10-3, are shown assembled in the battery module 10, nothing precludes a smaller or greater number of cells being used in the module. The use of the solid-state electrolyte layer 26 in the battery module 10, therefore, enables efficient facile build-up of the module's output voltage and power via bipolar stacking of the individual cells. As a result, such a battery module 10 may employ an appropriate number of individual cells stacked together to generate a 48 Volt output, as required in some automotive applications. The battery module 10 may be enclosed in a case or housing 28 configured to maintain uniaxial pressure P, such as along axis X via a face plate 28A, in the range of 10-5,000 KPa (shown in FIG. 3). The subject uniaxial pressure P is intended to enhance consistent cyclability of the battery cells, such as the cells 10-1, 10-2, and 10-3.

As shown in FIG. 4, individual battery cells 10-1, 10-2, 10-3 include corresponding current collectors 14-1, 14-2, 14-3 and the cathode layers 16-1, 16-2, 16-3. In the battery module 10 shown in FIG. 3, the current collector 14-1 is an outer or edge current collector arranged on the outer battery cell 10-1. Then outer current collector 14-1 may be configured as a single layer copper foil. Additionally, as shown, interior or intermediate cathode layers 16-1 and 16-2, i.e., the cathode layers situated within the interior of the battery module 10, may be positioned directly adjacent the respective interior current collectors 14-2 and 14-3. Each of the intermediate cathode layers 16-1 and 16-2 may be specifically configured as a clad foil having a copper layer 30 (operating as the bare current collector or electrode) and an aluminum layer 32 (operating as a cathode electrode or substrate), such that the aluminum layer is positioned between the copper layer and the respective cathode layer 16-1, 16-2, 16-3. In the clad foil embodiment of the cathode layers 16-1, 16-2, 16-3 the copper layer 30 is intended to shield and protect the respective aluminum layer 32 from the corresponding solid-state electrolyte layer 26.

As further shown in FIG. 5, the battery module 10 may further include individual blocker elements 34 configured to hermetically seal the respective cells 10-1, 10-2, 10-3, and thereby mitigate possibility of an ionic short-circuit therebetween. The blocker elements 34 are arranged along the sides of the respective cells 10-1, 10-2, and 10-3. Furthermore, the blocker elements 34 may be configured to adhere to the respective clad foils to thereby encapsulate and seal the gel 24 and the solid-state electrolyte layer 20 within its corresponding individual cell 10-1, 10-2, 10-3. The blocker element 34 may have a thickness in the 2-200 micron range. The blocker element 34 may be constructed from a suitably chemically stable and impervious to liquids material, such as a polymer. The material of the blocker element 34 may specifically include a hot-melt adhesive, polyethylene or polypropylene resin, a silicone (polyamide or epoxy resin), an acrylic resin or rubber, isocyanate adhesive, and/or acrylic or cyanoacrylate adhesive.

Effectiveness of the cathode layer 16, the solid-state electrolyte layer 20, and the gel 24 may be enhanced via use of specially selected materials. For example, in the embodiment where the anode-free solid-state battery 10 is a Li-Ion battery, the host cathode material 18 of the cathode layer 16 may include one or more of olivine, polyanion cathode, and lithium transition-metal oxide (e.g., a rock salt layered oxide, spinel) active materials. Additionally, the cathode layer 16 may have cathode material surface-coated thereon and/or be doped with a lithium transition-metal oxide and/or a low-voltage cathode material (e.g., a lithiated metal oxide/ sulfide or lithium sulfide). The material of the cathode layer 16 may additionally include an additive, e.g., be mixed with, at least one of carbon black, graphite, graphene, graphene oxide, acetylene black, and carbon nanofibers/nanotubes to enhance conductivity of the cathode.

For example, the cathode layer 16 may include solid-state electrolyte particles 20A of materials such as: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), $Li_2S-P_2S_5$ system, $Li_2S-P_2S_5-MO_x$ system (where $1<x<7$), $Li_2S-P_2S_5-MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, (1-x)$P_2S_5$-x$Li_2S$ (where $0.5 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI-Li_4SnS_4$, $Li_4SnS_4$, $Li_3N$, $Li_7PN_4$, $LiSi_2N_3$, $LiBH_4$, $LiBH_4-LiX$ (where x=Cl, Br, or I), $LiNH_2$, $Li_2NH$, $LiBH_4-LiNH_2$, $Li_3AlH_6$, $LiI$, $Li_3InCl_6$, $Li_2CdCl_4$, $Li_2MgCl_4$, $LiCdI_4$, $Li_2ZnI_4$, $Li_3OCl$, $Li_2B_4O_7$, $Li_2O-B_2O_3-P_2O_5$, and combinations thereof.

Figure 6:
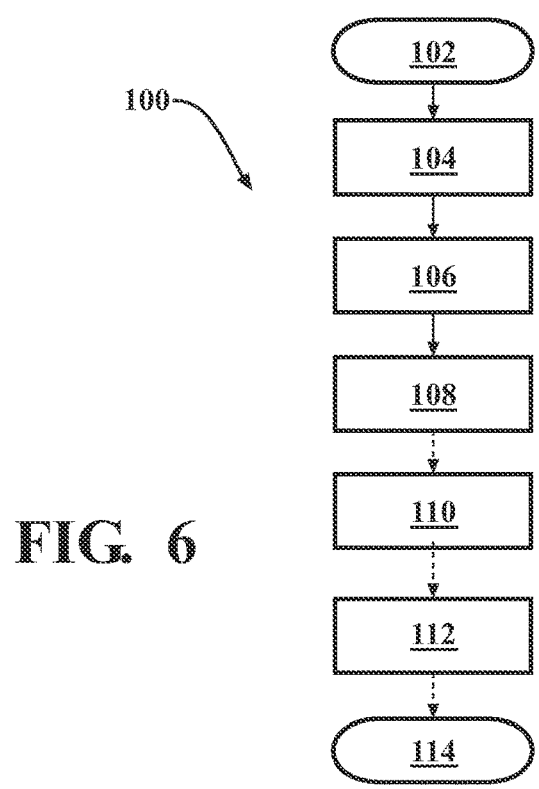
FIG. 6 illustrates a method of fabricating an anode-free solid-state battery, such as a lithium-ion battery, shown in FIGS. 1-6.

A method 100 of fabricating an anode-free solid-state battery, such as the battery 10 described with respect to FIGS. 1-5, is depicted in FIG. 6 and disclosed in detail below. Method 100 commences in frame 102 with providing electrodes for the battery 10. Accordingly, in frame 102 the method includes providing the composite cathode layer 16 via having the host cathode material 18, such as $LiFePO_4$, which includes transient anode elements 18A (e.g., lithium ions) therein, for example, applied to a substrate, such as the clad foil 30, 32. After frame 102, the method advances to frame 104.

In frame 104, the method includes arranging the solid electrolyte 20A combined with the gel precursor adjacent the composite cathode layer 16. Specifically, in frame 104 the method may include applying, e.g., spreading or coating, a mixture of the solid electrolyte 20A and the gel precursor onto the composite cathode layer 16. The gel precursor will thus impregnate the cathode layer 16 by filling the voids 22 in the host cathode material 18 (as well as the voids 22 in the solid-state electrolyte layer 20). The mixture of the solid electrolyte 20A and the gel precursor may be achieved by having the two constituents combined or blended to achieve a generally homogenous consistency. The solid electrolyte 20A may be provided as a granular material or powder. The gel precursor may include the polymer constituent material and the gel precursor solution having the liquid electrolyte, the polymer host, and the solvent, each apportioned by % weight of the gel. The solvent is specifically included in the gel precursor to subsequently dissolve the polymer host.

After frame 104, the method advances to frame 106. In frame 106 the method includes forming the gel 24 within each of the solid-state electrolyte layer 20 and the cathode layer 16. Forming the gel 24 may include evaporating the solvent from the gel precursor by drying the prefabbed structure of the battery 10 at room temperature (25 degrees C.) or above for 30 minutes to 24 hours. By thus evaporating the solvent, the gel 24 will be formed in the voids 22 of the cathode layer 16 and also in the voids 22 of the solid-state electrolyte layer 20 to thereby form the gelled solid-state electrolyte layer 26. In frame 106, the solvent may be permitted to evaporate, such that the gel 24 forms in-situ within the battery 10.

From frame 106, the method advances to frame 108, where the method includes arranging against the gelled solid-state electrolyte layer 26 the bare current collector 14. As described with respect to FIGS. 1-5, the in-situ formed gel 24 is configured to facilitate ionic conduction of the anode elements 18A between the cathode layer, the solid-state electrolyte layer 20, and the bare current collector 14 through the gelled solid-state electrolyte layer 26. Specifically, charging of the battery 10 extracts the anode elements 18A from the cathode layer 16, diffuses the anode elements via the gelled solid-state electrolyte layer 26, and deposits the anode elements onto the bare current collector 14. Additionally, discharging of the battery 10 returns the anode elements 18A via the gelled solid-state electrolyte layer 26 from the current collector 14 to the cathode layer 16. Charging and discharging of the battery 10 is accomplished via ionic transfer of anode material via the gel 24 and a reversible in-situ formation of the anode material on the current collector 14. Such a method of generating a temporal anode on the current collector 14 is intended to provide a high energy density and cycling capacity battery 10.

After frame 108, the method may proceed to frame 110. In frame 110, the method may include arranging the polymer blocker element 34 within the battery 10. As described with respect to FIGS. 1-5, the polymer blocker element 34 is configured to adhere to each of the cathode layer 16 and the bare current collector 14 to thereby encapsulate and seal the gel 24 and the solid-state electrolyte layer 20 within the respective battery cell. The material of the polymer blocker element 34 may specifically include one or more adhesives for effective sealing of individual cells, such as cells 10-1, 10-2, and 10-3 in a battery module embodiment of the battery 10.

After frame 110, the method may advance to frame 112. In frame 112, the method may include assembling the battery 10, e.g., with the bipolarly stacked battery cells 10-1, 10-2, 10-3, as a battery module in the housing 28. Furthermore, in frame 112, the battery 10 may be assembled to enhance cyclability of the respective battery cells by maintaining uniaxial pressure thereon, such as via the face plate 28A. Assembling the battery 10 module may include arranging the bare current collector 14-1 on the outer battery cell. The outer current collector 14-1 may be configured as a single layer copper foil. Additionally, such a copper foil may be part of each intermediate current collector 14-2, 14-3. Specifically, as described with respect to FIG. 4, building up the battery 10 module may include arranging the intermediate current collectors 14-2, 14-3, each configured as a clad foil having a copper layer 30 and the aluminum layer 32, such that the aluminum layer 32 becomes positioned between the copper layer 30 and the solid-state electrolyte layer 20 of the respective battery cell 10-1, 10-2, 10-3. The method may conclude in frame 114 with the completion of the battery 10, e.g., having the temporal and reversible battery anode generated on the bare current collector 14, such as by tab welding the battery module inside the housing 28.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An anode-free solid-state battery comprising:
    a cathode layer having a host cathode material including transient anode elements;
    a bare current collector characterized by an absence of non-transitory anode material and configured to accept thereon the transient anode elements during battery charging;
    a solid-state electrolyte layer defining voids and arranged between the bare current collector and the cathode layer; and
    a gel situated within each of the solid-state electrolyte and the cathode layer, thereby configured to permeate the voids in the solid-state electrolyte layer to form a gelled solid-state electrolyte layer, coat the host cathode material, and facilitate ionic conduction of the anode elements between the cathode layer, the solid-state electrolyte layer, and the bare current collector;
    wherein:
        charging of the battery extracts the anode elements from the cathode layer, diffuses the anode elements via the gelled solid-state electrolyte layer, and reversibly deposits the anode elements onto the bare current collector to form a transient anode material; and
        discharging of the battery returns the anode elements, via the gelled solid-state electrolyte layer, from the current collector to the cathode layer.

2. The anode-free solid-state battery of claim 1, wherein the anode-free solid-state battery includes multiple bipolarly stacked battery cells.

3. The anode-free solid-state battery of claim 2, wherein the bare current collector is an outer current collector arranged on an outer battery cell and is configured as a single layer copper foil.

4. The anode-free solid-state battery of claim 2, wherein the bare current collector is part of an intermediate current collector arranged between individual battery cells configured as a clad foil having a copper layer and an aluminum layer, such that the aluminum layer is positioned between the copper layer and the cathode layer.

5. The anode-free solid-state battery of claim 1, further comprising a polymer blocker element configured to encapsulate and seal the gel and the solid-state electrolyte within the battery.

6. The anode-free solid-state battery of claim 5, wherein material of the polymer blocker element includes at least one of a hot-melt adhesive, polyethylene or polypropylene resin, a silicone, and an acrylic resin or rubber, isocyanate adhesive, acrylic or cyanoacrylate adhesive.

7. The anode-free solid-state battery of claim 1, wherein the anode-free solid-state battery is a lithium-ion battery, wherein the host cathode material includes at least one of olivine, polyanion cathode, lithium transition-metal oxide, a cathode material surface-coated and/or doped with a lithium transition-metal oxide, and a low-voltage lithiated metal oxide/sulfide or lithium sulfide.

8. The anode-free solid-state battery of claim 7, wherein the material of the cathode layer additionally includes a conductive additive having at least one of carbon black, graphite, graphene, graphene oxide, acetylene black, and carbon nanofibers/nanotubes.

9. The anode-free solid-state battery of claim 1, wherein at least one of the host cathode material and the solid-state electrolyte layer additionally includes a binder material having at least one of polyvinylidene fluoride (PVDF), polytetrafluoroethylene (PTFE), sodium carboxymethyl cellulose (CMC), styrene rubber (SBR), nitrile butadiene rubber (NBR), and styrene ethylene butylene styrene copolymer (SEBS).

10. The anode-free solid-state battery of claim 1, wherein the gel includes a polymer constituent material and a liquid electrolyte.

11. A method of fabricating an anode-free solid-state battery, the method comprising:
    arranging adjacent one another:
        a solid-state electrolyte layer defining voids combined with a gel precursor including a solvent, such that the gel precursor permeates the voids; and
        a cathode layer having a host cathode material including transient anode elements;
    forming a gel within the solid-state electrolyte layer and the cathode layer, to thereby form a gelled solid-state electrolyte layer and coat the host cathode material; and
    arranging against the gelled solid-state electrolyte layer a bare current collector characterized by an absence of non-transitory anode material and configured to accept thereon the transient anode elements during battery charging, wherein, thereby, the formed gel facilitates ionic conduction of the anode elements between the cathode layer, the solid-state electrolyte layer, and the bare current collector;
    such that:
        charging of the battery extracts the anode elements from the cathode layer, diffuses the anode elements via the gelled solid-state electrolyte layer, and reversibly deposits the anode elements onto the bare current collector to form a transient anode material; and
        discharging of the battery returns the anode elements, via the gelled solid-state electrolyte layer, from the current collector to the cathode layer.

12. The method of claim 11, wherein stacking relative to one another the bare current collector, the cathode layer, and the solid-state electrolyte includes constructing multiple bipolarly stacked battery cells.

13. The method of claim 12, further comprising arranging the bare current collector on an outer battery cell, and wherein the bare current collector is an outer current collector configured as a single layer copper foil.

14. The method of claim 12, further comprising arranging the bare current collector between individual battery cells, wherein the bare current collector is part of an intermediate current collector configured as a clad foil having a copper layer and an aluminum layer, further comprising arranging the intermediate current collector such that the aluminum layer is positioned between the copper layer and the cathode layer.

15. The method of claim 11, further comprising arranging a polymer blocker element to encapsulate and seal the gel and the solid-state electrolyte within the battery.

16. The method of claim 15, wherein material of the polymer blocker element includes at least one of a hot-melt adhesive, polyethylene or polypropylene resin, a silicone, and an acrylic resin or rubber, isocyanate adhesive, acrylic or cyanoacrylate adhesive.

17. The method of claim 11, wherein the anode-free solid-state battery is a lithium-ion battery, wherein the host cathode material includes at least one of olivine, polyanion cathode, lithium transition-metal oxide, a cathode material surface-coated and/or doped with a lithium transition-metal oxide, and a low-voltage lithiated metal oxide/sulfide or lithium sulfide.

18. The method of claim 17, wherein the material of the cathode layer additionally includes a conductive additive having at least one of carbon black, graphite, graphene, graphene oxide, acetylene black, and carbon nanofibers/nanotubes.

19. The method of claim 11, wherein at least one of the host cathode material and the solid-state electrolyte layer additionally includes a binder material having at least one of polyvinylidene fluoride (PVDF), polytetrafluoroethylene (PTFE), sodium carboxymethyl cellulose (CMC), styrene rubber (SBR), nitrile butadiene rubber (NBR), and styrene ethylene butylene styrene copolymer (SEBS).

20. The method of claim 11, wherein the formed gel includes a polymer constituent material and a liquid electrolyte, the method additionally includes loading a gel precursor having the polymer constituent material, the liquid electrolyte, and a solvent onto the solid-state electrolyte prior to arranging the solid-state electrolyte and cathode layers adjacent one another, and wherein forming the gel includes evaporating the solvent from the gel precursor after the solid-state electrolyte and cathode layers have been arranged adjacent one another.

\* \* \* \* \*